United States Patent [19]

Holland-Letz

[11] Patent Number: 4,689,704
[45] Date of Patent: Aug. 25, 1987

[54] PRESSURE DEVICE FOR AT LEAST ONE ELECTROMAGNETIC TRANSDUCER HEAD

[75] Inventor: Guenter Holland-Letz, Paderborn, Fed. Rep. of Germany

[73] Assignee: Nixdorf Computer AG, Paderborn, Fed. Rep. of Germany

[21] Appl. No.: 781,424

[22] Filed: Sep. 30, 1985

[30] Foreign Application Priority Data

Nov. 15, 1984 [DE] Fed. Rep. of Germany ....... 3441848

[51] Int. Cl.4 ......................... G11B 5/54; G11B 21/16
[52] U.S. Cl. .................................... 360/104; 360/105; 360/109; 360/2
[58] Field of Search .................... 360/105, 104, 109, 2

[56] References Cited

U.S. PATENT DOCUMENTS

| 3,836,753 | 9/1974 | Pass | 360/2 X |
| 3,940,796 | 2/1976 | Haun et al. | 360/109 |
| 4,340,918 | 7/1982 | Jansen | 360/104 X |

FOREIGN PATENT DOCUMENTS 2741473 3/1979 Fed. Rep. of Germany ...... 360/104

Primary Examiner—John H. Wolff
Attorney, Agent, or Firm—Cullen, Sloman, Cantor, Grauer, Scott & Rutherford

[57] ABSTRACT

With a device for pressing at least one magnetic read/write head (16) against a recording medium (14) in motion relative to it with a swivel-mounted pressure lever (52) carrying the read/write head (16) that runs in the recording medium's (14) direction of motion and is pressed to the recording medium (14) by means of spring force and with stationary guide elements (76, 78) that limit read/write head (16) movement at right angles to the recording medium's (14) direction of motion. The read/write head (16) is equipped with pivot pins (90, 92) that, in the pressed operating position of read/write head (16), define a swivel axis lying approximately parallel to recording medium (14) as well as its direction of motion and that are held in the position at pressure lever (52) as well as by means of guide elements (76, 78) that are displaceably directed in the direction of pressure of the read/write head.

17 Claims, 6 Drawing Figures

PRESSURE DEVICE FOR AT LEAST ONE ELECTROMAGNETIC TRANSDUCER HEAD

TECHNICAL FIELD

The invention concerns a device for pressing at least one magnetic read/write head against a recording medium in motion relative to it with a swivel mounted pressure lever carrying the read/write head that runs in the recording medium's direction of motion and is pressed to the recording medium by means of spring force and with stationary guide elements that function to limit movement of the read/write head at right angles to the recording medium's direction of motion.

BACKGROUND ART

For magnetic recording, erasing, and/or reproducing equipment, various techniques have been used to bring a recording medium into contact with a magnetic read/write head. Either the recording medium is pressed against the read/write head, or the read/write head is pressed against the recording medium. The latter approach has proven especially advantageous for relatively rigid recording media, e.g. magnetic cards, since the read/write head can then, with corresponding guides, also follow a varying surface contour of the recording medium. This is especially significant for magnetic cards used as recording media because they are frequently no longer flat as a consequence of their use and because of the characters occasionally imprinted on them.

A device for pressing magnetic read/write heads, separate for each magnetic track, of a multiple magnetic head against a magnetic card in motion relative to it is disclosed in British Patent Specification No. 2,115,597. In this prior device, each individual read/write head is equipped with a groove in which a pressure lever is fastened. This pressure lever is designed as a sheet-metal strip running in the direction of movement of the recording medium with a flat extension parallel to the plane of the recording medium. In the vicinity of its open end it is equipped with a bore with which it is pivoted on a pin. In the immediate vicinity of the read/write head, an oblong slot is provided in the pressure lever running in the direction of the recording medium with which the pressure lever is displaceably directed in the read/write head's direction of pressure in order to limit the motion of the read/write head at right angles to the direction of movement of the recording medium. The pressure lever is loaded in the direction of the recording medium with a leaf-type spring with the point of load application being in the vicinity of the read/write head. The open end of the leaf-type spring is shaped as a convex semicircle and, ideally, presses axially upon the pressure lever with a hemispherical, crater-shaped angle of elevation centrally located at the head. Thus, the pressure lever is stressed at points along its longitudinal axis in order to allow for certain mobility of the read/write head around the pressure lever's longitudinal axis. This freedom of movement of the read/write head is desired so that it can also adapt to the surfaces of recording media that may be curved at right angles to its direction of movement. On the other hand, this desired freedom of movement necessitates that either the pressure lever be pivoted with some play or be led to the guide pin with play in order to avoid its tilting as much as possible. However, this has the disadvantage that the pressure lever and thus also the magnetic read/write head in the direction of movement of the recording medium as well as at right angles to the direction of movement of the recording are inaccurately guided.

SUMMARY OF THE INVENTION

Thus, it is the object of this invention to provide a simple, precise, and an operationally reliable device for pressing at least one magnetic read/write head against a recording medium in motion relative to it with which an optimal contact of the read/write head is assured even with curved recording media.

This object is achieved by equipping the read/write head with pivot pins that, in the pressed operating position of the read/write head, define a swivel axis lying approximately parallel to the recording medium as well as its direction of motion, and that are held in this position by a pressure lever as well as by means of guide elements that are displaceably directed in the direction of pressure.

The read/write head itself swivels around the swivel axis of its pivot pins so that optimal contact of the read/write head to the recording medium is assured, even with sharply curved recording media. Contrary to the current state of the art, the guiding precision of the read/write head at right angles to the recording medium's direction of motion is not affected by the swivel feature since the pivot pins that allow for the swiveling motion are not situated on the guide lever, but rather are on the read/write head and can be led in a very precise rectilinear manner. Furthermore, in the device according to this invention, the read/write head cannot carry out any motion in the direction of motion of the recording medium since the pressure lever carrying the read/write head can only be pivoted in a swingable manner free of play in the direction of the recording medium. The read/write head guide functions largely without any friction hysteresis since with it possible tilting of the pressure lever, as is possible in prior devices, can be avoided.

The invention has the further advantage that a defective read/write head can be replaced very easily without having to replace the pressure lever at the same time. Thus, in comparison to prior devices, there are more favorable repair as well as maintenance costs.

The invention can be used especially advantageously for pressing and guiding the individual magnetic read/write heads of a multiple magnetic head with devices for reading magnetic cards with several magnetic tracks. Since the read/write heads can be pressed independently of each other and can be guided very precisely, they contact precisely at each individual corresponding magnetic track even when used with sharply irregular magnetic cards.

In a preferred embodiment of the invention, the pressure lever is essentially U-shaped whereby the open end of the one arm located near the recording medium's plane is pivoted in a swingable manner and the open end of the other arm carries the read/write head. Since the read/write head must be pressed onto the recording medium normal to the recording medium, it is, on the one hand, necessary that the pressure lever is pivoted in a swingable manner in the vicinity of the plane of the recording medium. On the other hand, the pressure lever must have a minimum lengh for guiding the read/write head in order to achieve a most rectilinear motion of pressure. The pressure lever's U-shaped design makes this possible so that the space in the vicinity of the plane of the recording medium that otherwise is taken up by the pressure lever can be used for the pressure transport pulleys, for example, so that, as a whole, compact dimensions result for a device of that kind.

The arm carrying the read/write head has an advantageous fork-shaped design whereby the pivot pins of the read/write head are located in the forked ends. This design of the pressure lever allows locating the read/wrie head in the inside of the fork so as to swing freely.

The pressure lever, in the vicinity of its open end, is preferably equipped with a stop pin that limits its swing path toward the recording medium. Since the pressure lever is pressed in the direction of the recording medium by means of spring tension, this stop pin can hold the read/write head in place in a fixed position at the periphery of the recording medium's range of motion so that the read/write head does not grind against the transporting device at those times when no recording medium is lying against it. This contact would lead to an unnecessary wear and tear of the read/write head and the transporting device.

In another aspect of the invention, the pressure lever is an areal segment with a flat extension normal to the plane of the recording medium. The resulting advantage is that several read/write heads can be located next to each other in a cramped space and yet can be led without swiveling since the pressure levers have a high bending resistance in the direction of pressure due to their design.

In a further aspect of the invention, the thickness of the pressure lever, at least in the area of the pivot pins' support, is smaller than the diameter of the pivot pins of the read/write head. This has the advantage that the pivot pins, by means of the guide elements, can be led directly to those points in the direction of pressure where they are also held to the pressure lever so that the read/write head's pivot pins can be designed to be very short which contributes to compact dimensions of such a pressing device.

In still another aspect of the invention, at least one pivot pin of a read/write head at its circumferential area is equipped with at least one angle of elevation running in a circumferential direction that is guided in a corresponding groove of the pressure lever. As a result, the read/write head can be pivoted tolerance-free in the axial direction of its pivot pins whereby it still remains able to swing around the swivel axis defined by its pivot pins.

The pressure lever is located advantageously on a swivel axis by means of an oblong slot whose longitudinal edges converge in the direction normal to the plane of the recording medium and, at one oblong slot end, have an interval between each other that is smaller than the diameter of the swivel axis. This type of pressure lever seating represents a most cost effective tolerance-free pivoting since the oblong slot merely has to be punched out. If, for example, the longitudinal edges of the oblong slot converge in the direction of the plane of the recording medium, then the pressure lever must be stressed in the direction away from the plane of the recording medium with the aid of a separate spring that engages the pressure lever in the vicinity of the oblong slot in order to bring the longitudinal edges of the oblong slot into contact on the swivel axis. If, on the other hand, the longitudinal edges of the oblong slot diverge in the direction of the plane of the recording medium, then no special supplementary spring is necessary since the longitudinal edges of the oblong slot are pressed to the swivel axis at the same time as the pressure lever is pressed in the direction of the recording medium by means of the spring tension.

The pressure lever is preferably stressed in the direction of the recording medium by means of a tension spring since the tension spring is easily accommodated with regard to space requirements by a U-shaped pressure lever.

As another feature of the invention, guide slots are equipped as guide elements, whereby the pivot pins of the read/write head are displaceably directed in the direction of pressure of the read/write head. The guide slots as well as the pivot pins can be made very precisely so that the read/write head can be guided very exactly, and essentially without any friction hysteresis.

Preferably, the guide slots are located in two guide plates with a flat extension approximately normal to the plane of the recording medium as well as approximately at right angles to its direction of motion. The advantage of using guide plates with guide slots is that these can be made as stamped parts in a very cost effective manner. By using homogeneous stamped parts for both guide plates, tolerance is avoided that could affect the alignment of the read/write head to the movement of the cards.

The guide plates are made transversely movable by means of arranged fastening components on their edges running approximately normal to the plane of the recording medium. Accordingly, the guide plates can be pressed in a direction at right angles to the recording medium's direction of motion by means of a transverse spring in order to take up a precisely defined position.

In another aspect of the invention, grooves are provided in the guide plates in which the pressure lever is displaceably directed in the direction of pressure. The resulting advantage is that not only the read/write head's pivot pins but also the pressure lever is guided with the aid of the guide plates.

As still a further feature of this invention, spring elements are assigned to the guide slots, whereby the spring elements press the pivot pins respectively on an inner wall of a guide slot. The resulting advantage is that any potential manufacturing tolerances of the guide slots and the pivot pins do no have a negative effect on the read/write heads' guiding precision since the read/write heads' pivot pins are led tolerance-free between an inner wall of a guide slot and the respectively assigned spring elements.

Since the spring elements press against the pivot pins with a specific spring tension respectively on an inner wall of a guide slot, a small friction force occurs by the displacement of the pivot pins in the guide slots by means of which any potential vibrations of the read/write head are damped.

Bar-shaped or leaf-shaped spring elements have proved to be especially advantageous since the pivot pins can glide along their longitudinal sides as well as their longitudinal edges.

As a further feature of the invention, with a device for pressing several magnetic read/write heads onto a recording medium in motion relative to them, several bar-shaped or respectively leaf-shaped spring elements are combined into a comb of springs by means of a common mounting that also connects them. It is advantageous that the separate spring elements do not have to be attached to the guide slots. The entire comb of springs can be attached to the guide plate as a structural component.

DETAILED DESCRIPTION OF THE PREFERRED EMBODIMENTS

Figure 1:
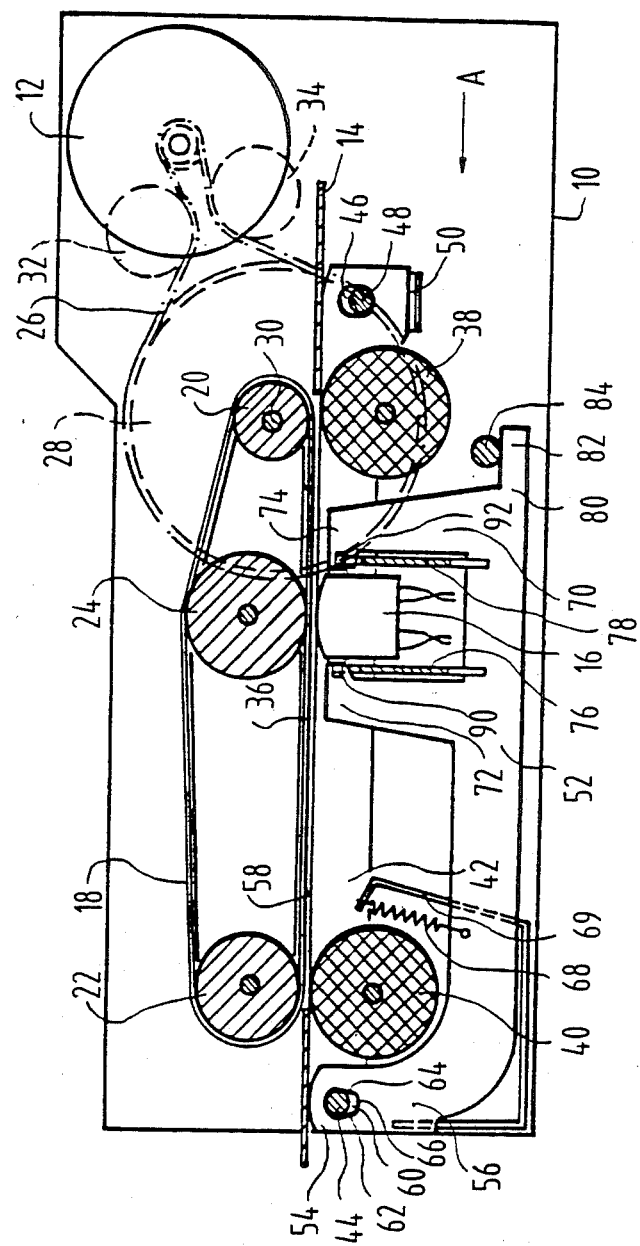
FIG. 1 is a longitudinal sectional view of a magnetic card reader taken along the line I—I of FIG. 6.

FIG. 1 shows a magnetic card reader with a housing 10. Within the housing is a transporting device which includes a motor 12 for driving a magnetic card 14 and a device for pressing magnetic read/write heads 16 (only one being depicted) onto a magnetic card 14 which is in motion relative to them. The transporting device comprises a conveyor belt 18 that is driven via a drive pulley 20, diverted at a tail or end pulley 22, and, in addition, guided by a free-spinning supporting roller 24. Drive pulley 20 is driven, in turn, by driving motor 12 via a driving belt 26, a belt pulley 28, and a driving axle 30. In order to achieve precise synchronization of conveyor belt 18, driving belt 26 is prestressed by tension rollers 32 and 34. Magnetic card 14 is pressed against conveyor belt 18 in order to transport magnetic card 14 through it. This occurs at the beginning and the end of the magnetic card's channel of motion 36 via pressure rolls 38 and 40. In the entire remaining section of the channel of motion 36, magnetic card 14 is pressed against conveyor belt 18 with a pressure strip 42. Since the friction coefficient and the area of pressure of magnetic card 14 is substantially larger with conveyor belt 18 than with the pressure strip 42, magnetic card 14 is moved along on the pressure strip 42 with the translatory speed of conveyor belt 18 in the channel of motion 36. It is pivoted on a swivel axis 44 on its left end in FIG. 1. On its right end in the FIG. 1, it is guided along an axis 48 with an oblong slot 46 and is loaded in the direction of the channel of motion 36 by means of a leaf-type spring 50.

In the course of transporting magnetic card 14 completely through the channel of motion 36, it is led past magnetic read/write heads 16 which come into contact with magnetic card 14 by means of the previously mentioned pressing device. The pressing device comprises as its main component a pressure lever 52 that is essentially U-shaped, whereby the open end 54 of the one arm 56 located near the magnetic card's plane 58 is pivoted in a swingable manner on swivel axis 44 by means of an oblong slot 60 whose longitudinal edges 62 and 64 diverge in the direction of magnetic card's plane 58 and, at the oblong slot end 66 that is turned away from the plane of the recording medium 58, have an interval between each other that is smaller than the diameter of swivel axis 44. In order to achieve a tolerance-free pivot of the pressure lever 52 in the magnetic card's 14 direction of motion, the longitudinal edges 62 and 64 of oblong slot 60 have to be pressed against swivel axis 44. With this arrangement of the oblong slot where longitudinal edges 62 and 64 diverge in the direction of magnetic card's plane 58, this is achieved by means of a tension spring 48 that stresses pressure lever 52 toward the direction of magnetic card's plane 58. Thus, with this alignment of the oblong slot, no separate arrangement of springs for the pivoting of pressure lever 52 is necessary. For each pressure lever 52, a separate tension spring 68 is provided. All tension springs 68 are mounted on a strap 69.

The other arm 70 of the essentially U-shaped pressure lever 52 is designed fork-like and carries read/write head 16 on its forked ends 72 and 74. It, together with pressure lever 52, is displaceably led in the read/write head's 16 direction of pressure by means of the guide plates 76 and 78. The pivoting and guiding of read/write head 16 will be further explained with reference to FIGS. 2 through 5.

Pressure lever 52 is provided with a stop pin 82 at its open end 80. It comes into contact at a stationary fixed axis 84 and thus limits the swinging range of pressure lever 52 in the direction of the magnetic card's plane 58.

Pressure lever 52 consists of a plate having a flat extension normal to the magnetic card's plane 58. This has the advantage that pressure lever 52 has a high resistance against bending in the read/write head's 16 direction of pressure so that undesired vibrations of the magnetic head 16 in the direction of pressure can be avoided. The construction of pressure lever 52 as a plate has the further advantage that it can be economically manufactured, as from stamped sheet metal.

Figure 2:
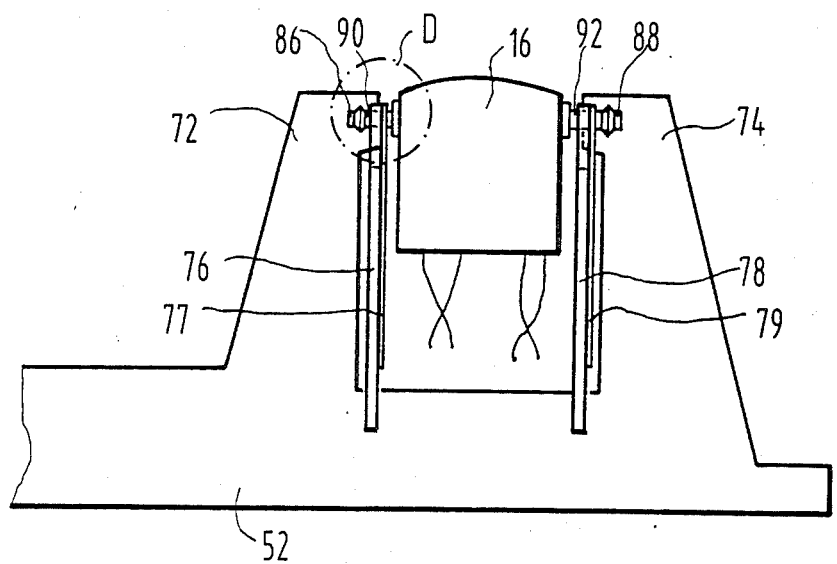
FIG. 2 is an enlarged elevational view of the magnetic read/write head in the forked ends of the pressure lever.

FIG. 2 depicts how read/write head 16 is situated in the forked ends 72 and 74 of pressure lever 52. In each of the forked ends 72 and 74, an essentially U-shaped notch 86 and 88 is provided in which read/write head's 16 pivot pins 90 and 92 are situated. In these notches 86 and 88, pivot pins 90 and 92 are kept free of play in the read/write head's 16 direction of pressure. In the direction at right angles to the magnetic card's 14 direction of motion, pivot pins 90 and 92 are displaced to notches 86 and 88. This motion of read/write head 16 and thus also of pivot pins 90 and 92 is limited by guide plates 76 and 78 and by the combs of springs 77 and 79 as will still be further explained with the aid of FIG. 5.

Figure 3:
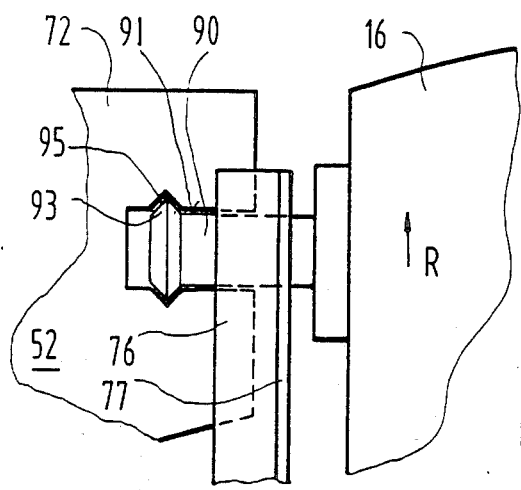
FIG. 3 is an enlarged view of the area "D" in FIG. 2.

FIG. 3 depicts the pivoting and guiding of pivot pin 90 of read/write head 16 in notch 86 provided for in forked end 72 of pressure lever 52. As can be seen from FIG. 3, pivot pin 90 at its circumferential area 91 is ring-shaped in the circumferential direction with one angle of elevation 93 having a triangularly shaped cross-section running in a circumferential direction that is led in a corresponding groove 95 of pressure lever 52. Thus, tightly toleranced pivoting of read/write head 16 can be realized in the axial direction of pivot pin 90. In the direction of pressure R of read/write head 16, pivot pin 90 is guided displaceably by means of guide plate 76 and comb of springs 77.

Figure 4:
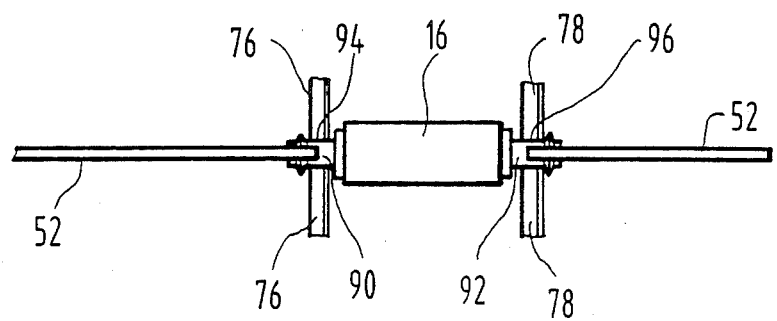
FIG. 4 is a top view of the part of the pressure lever shown in FIG. 2, including the magnetic read/write head.

From FIG. 4 it can be appreciated that the thickness of pressure lever 52 is smaller than the diameter of pivot pins 90 and 92 respectively. This is necessary so that pivot pins 90 and 92 can be led directly to guide slots 94 and 96 (also see FIG. 5) of guide plates 76 and 78 to those points where they are also held in notches 86 and 88.

Figure 5:
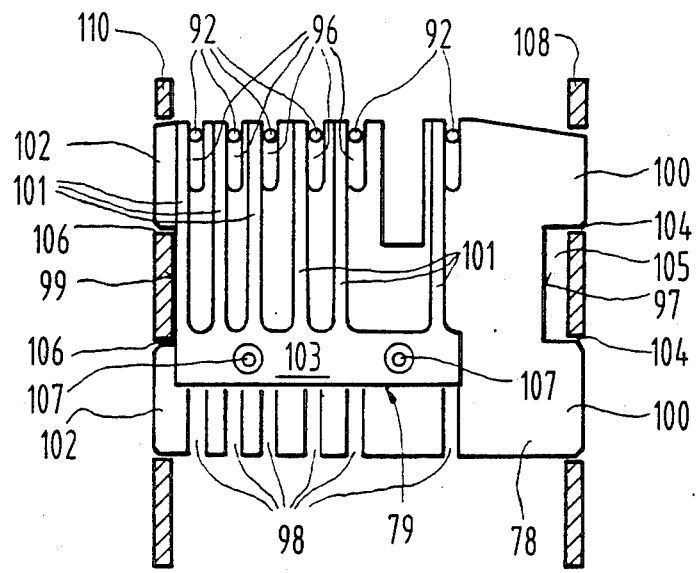
FIG. 5 is a view in the direction "A" of the guide plate including the comb of springs of FIG. 1.

FIG. 5 depicts guide plate 78 including the comb of springs 79 of FIG. 1 from the point of view A. It can be seen that guide slots 96 guide the pivot pins 92 of a multiple magnetic head consisting of six individual read/write heads. Grooves in guide plate 78 are identified by the numeral 98 in which the pressure levers 52 (FIG. 1) of the individual read/write heads are also displaceably guided in their direction of pressure.

The comb of springs 79 consists of six leaf-shaped spring elements 101 that are connected with one another by means of a common mounting 103 with which it is fastened to guide plate 78 by means of rivets or screws 107. By means of spring elements 101 that are assigned to guide slots 96, pivot pins 92 are pressed respectively against the right (as seen in FIG. 5) inner wall of guide slots 96 whereby any potential manufacturing tolerances of guide slots 96 and pivot pins 92 are equalized.

Guide plate 78 as well as guide plate 76 are equipped with flaps 100 and 102 on their edges 97 and 99 running approximately normal to the recording medium's plane. These are anchored in recesses 104 and 106 of the inner longitudinal walls 108 and 110 of the magnetic card reader. By this construction, flaps 100 which, in comparison to flaps 102, are at least one thickness of a longitudinal wall longer are inserted into recesses 104 first. Then, the shorter flaps 102 are inserted into recesses 106. Thus, an open space 105, in which a transverse leaf-type spring 112 (FIG. 6) can be located, occurs between guide plate 78 and longitudinal wall 110. It then presses guide plate 78 in the direction of longitudinal wall 110 so that it is fixed precisely in position. The detachable mounting of guide plates 76 and 78 makes it possible that the individual pressure levers 52 including their read/write heads 16 can be swiveled outwards after taking out guide plates 76 and 78 or unhinging tension springs 68 of all pressure levers 52 so that the read/write heads are easily accessible for cleaning purposes.

Figure 6:
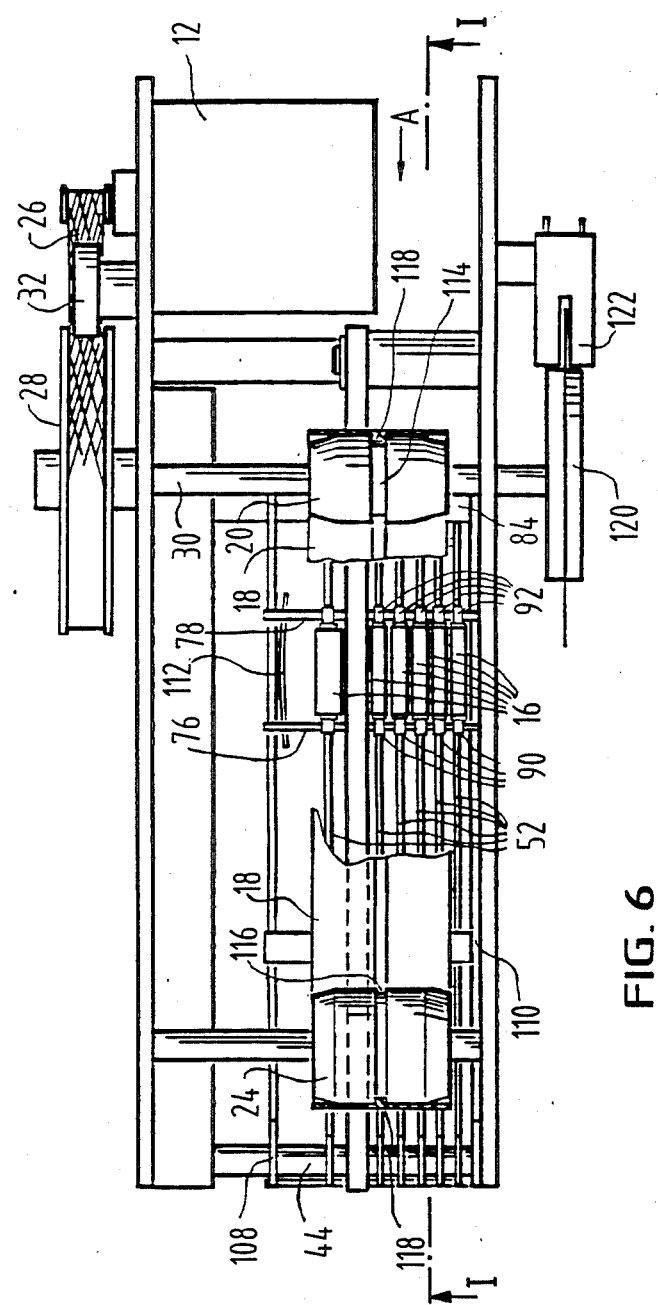
FIG. 6 is a top view of the magnetic card reader of the present invention.

FIG. 6 depicts a top view of the magnetic card reader and shows more clearly the arrangement of the individual pressure levers 52, the individual read/write heads 16, and both the guide plates 76 and 78 in the magnetic card reader. FIG. 6 also depicts driving motor 12, driving belt 26, tension roller 32, and belt pulley 28, via which driving axle 30 and drive pulley 20 are driven which in turn drives conveyor belt 18 that is represented only in a piecemeal manner and is diverted at tail pulley 24. Drive pulley 20 as well as supporting roller 24 are equipped approximately axially with a circumferential groove 114 and 116 in which respectively a guide rib 118 of conveyor belt 18 runs. This guide rib 118 prevents lateral drifting of conveyor belt 18. The inner longitudinal walls of the magnetic card reader are identified at 108 and 110 in which guide plates 76 and 78 are anchored. The individual pressure levers 52 are each pivoted in a swivelable manner at swivel axis 44. Their swing path in the direction of the magnetic card's plane 58 (FIG. 1) is limited by fixed axle 84. A scanning disk 120 passes partially through a light relay 122. This arrangement of scanning disk 120 and light relay 122 represents a precise tachometer that is needed for the synchronization control of driving motor 12.

The inner longitudinal walls 108, 110 are also pivoted on swivel axis 44. Thus, they form a subassembly unit along with the pressure levers 52 and the read/write heads 16 that can be swiveled outwards around axis 44 for cleaning purposes, for example.

The top view (FIG. 6) of the pressing device more clearly shows the rigid guide and holding devices of the individual read/write heads 16. The read/write heads 16 are not guided tolerance-free both in the direction of motion as well as at right angles to the magnetic card's direction of motion. They have only the desired degree of freedom of mobility so that, on the one hand, they can be deflected normal to the magnetic card's plane and, on the other hand, so that they are swivelable around the swivel axis of pivot pins 90 and 92. Since pivot pins 90 and 92 are led to guide slots 94 and 96 (FIG. 3) of guide plates 76 and 78 located in a precisely defined location in the magnetic card reader with great precision to limit the motion of read/write heads 16 at right angles to the magnetic card's direction of motion, a tilting of pressure lever 52 is precluded whereby guiding of read/write heads 16 without friction hysteresis is assured.

What is claimed is:

1. A device for pressing a plurality of electromagnetic heads (16) against a recording medium (14) which moves in a direction past the heads (16), comprising:

a plurality of side-by-side levers (52) for respectively carrying said heads (16), said levers (52) each having one end thereof pivotally mounted to allow movement of the corresponding head (16) toward and away from the recording medium (14);

a plurality of pairs of pivot pins (90, 92) respectively mounting said heads (16) on the other ends of the corresponding levers (52) for pivotal movement about axes extending generally parallel to the direction of movement of said recording medium (14);

a pair of spaced apart guide plates (76, 78) extending transverse to each of said levers (52) and respectively including elongate guide slots (94, 96) therein extending in a direction toward said recording medium, said pivot pins (90, 92) being respectively slideably disposed within said guide slots (94, 96), whereby the movement of each of said heads (16) toward and away from said recording medium (14) is guided by the cooperation of said pivot pins (90, 92) with said guide slots (94, 96);

means (68) for urging each of said levers (52) to pivot about said one end thereof to press said heads (16) against said recording medium (14);

structure (108, 110) upon which each of said plates (76, 78) is mounted, there being some tolerance space between said plates (76, 78) and said structure allowing movement of said plates (76, 78) relative to said structure (108, 110) in a direction transverse to the direction of movement of the recording medium; and, a spring (112) biasing said plates (76, 78) against said structure to prevent relative transverse movement therebetween, whereby all of said heads (96) are maintained in predetermined positions in a direction transverse to the direction of movement of the recording medium.

2. The device of claim 1, wherein each of said levers (52) is defined by a plate having a U-shaped opening therein, the corresponding head (16) being disposed within said U-shaped opening, said U-shaped opening intersecting said guide slots (94, 96).

3. The device of claim 2, wherein said pivot pins (90, 92) extend through the intersection of said U-shaped opening and said guide slots (94, 96).

4. The device of claim 1, wherein said structure includes a pair of spaced apart walls (108, 110) on which said guide plates (76, 78) are mounted and said spring (112) is interposed between one of said walls (108) and said plates (76, 78).

5. The device of claim 4, wherein said walls are defined by a pair of mounting plates (108, 110) extending transverse to said guide plates (76, 78), one of said mounting plates (11) defining said wall (110), said mounting plates including recesses (104, 106) therein, said guide plates (76, 78) being slideably received within said recesses (104, 106).

6. The device of claim 1, wherein each of said levers (52) includes an open end (80) and a stop pin (82) adjacent said open end (80) that limits the swing path of the lever (52) toward said recording medium.

7. The device of claim 1, wherein each of said levers (52) is defined by a plate lying in a plane extending normal to the plane of the recording medium.

8. The device of claim 7, wherein the thickness of each of the levers (52) adjacent the corresponding pivot pins (90, 92) is less than the diameter of said pivot pins (90, 92).

9. The device of claim 1, wherein at least one of said pivot pins (90) in each paid thereof includes a circumferentially extending, radially enlarged portion (93) received in a corresponding groove (95) of the corresponding lever (52).

10. The device of claim 9, wherein the radially enlarged portion (93) has a triangularly shaped cross section.

11. The device of claim 9, wherein the radially enlarged portion (93) is ring shaped in its circumferential direction.

12. The device of claim 1, wherein each of said levers (52) is provided with an oblong slot (60) in said one end thereof and said device includes a swivel shaft (44) extending through the oblong slots (60) to pivotally mount said one end of each of said levers (52), said slot (60) having longitudinal sides (62, 64) converging in a direction normal to the plane of the recording medium, the distance between opposing sides of the slot adjacent one end of the slot being smaller than the diameter of said swivel shaft (44).

13. The device of claim 1, including a spring (68) for loading each of said levers (52) in the direction of the recording medium.

14. The device of claim 1, wherein said guide plates (76, 78) are transversely moveable by means of fastening components (100, 102) having edges (97, 99) running approximately normal to the plane of the recording medium (14).

15. The device of claim 1, including spring elements (101) cooperating with said guide slots (94, 96) and pressing each pair of said pivot pins (90, 92) respectively on an inner wall of a corresponding one of said guide slots.

16. The device of claim 1, wherein said spring elements are bar shaped.

17. The device of claim 16, wherein said spring elements (101) are defined by a comb of springs (79) including a common mounting connecting said spring elements (101).

* * * * *